(12) United States Patent
Gaur et al.

(10) Patent No.: US 12,417,349 B2
(45) Date of Patent: Sep. 16, 2025

(54) DYNAMIC QUESTION GENERATION FOR INFORMATION-GATHERING

(71) Applicant: SAMSUNG ELECTRONICS CO., LTD., Gyeonggi-Do (KR)

(72) Inventors: Manas Gaur, San Jose, CA (US); Dalkandura Arachchige Kalpa Shashika Silva Gunaratna, San Jose, CA (US); Vijay Srinivasan, San Jose, CA (US); Hongxia Jin, San Jose, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 464 days.

(21) Appl. No.: 17/817,778

(22) Filed: Aug. 5, 2022

(65) Prior Publication Data

US 2023/0061906 A1    Mar. 2, 2023

Related U.S. Application Data

(60) Provisional application No. 63/231,025, filed on Aug. 9, 2021.

(51) Int. Cl.
  *G10L 15/26* (2006.01)
  *G06F 16/242* (2019.01)
  (Continued)

(52) U.S. Cl.
  CPC ............ *G06F 40/30* (2020.01); *G06F 16/243* (2019.01); *G06F 16/3329* (2019.01); *G06F 40/211* (2020.01)

(58) Field of Classification Search
  None
  See application file for complete search history.

(56) References Cited

U.S. PATENT DOCUMENTS 10,229,188 B2 * 3/2019 Cortis .................. G06F 16/334
10,496,928 B2   12/2019 Oh et al.
(Continued)

OTHER PUBLICATIONS

Borgeaud S, et al., "Improving language models by retrieving from trillions of tokens," arXiv preprint, arXiv:2112.04426, Dec. 8, 2021, 43 pg.

(Continued)

*Primary Examiner* — Neeraj Sharma
(74) *Attorney, Agent, or Firm* — Kevin T. Cuenot

(57) ABSTRACT

Computer-based generation of information-gathering questions in response to a user query can include parsing the user query using natural language processing and extracting from the user query one or more phrases corresponding to a predetermined category. A knowledge database can be accessed, and entities semantically related to each phrase can be extracted therefrom. A query sub-graph representing a relationship between each of the one or more phrases and the entities extracted from the knowledge database can be generated. An expanded user query can be generated by traversing the query sub-graph. Passages semantically related to the expanded user query can be retrieved from one or more passages databases and ranked. A neural question generator can generate a set of information-gathering questions based on the expanded user query and a group of select passages selected from the plurality of passages in accordance with each selected passage's ranking.

18 Claims, 8 Drawing Sheets

(51) Int. Cl.
    *G06F 16/3329*    (2025.01)
    *G06F 40/211*    (2020.01)
    *G06F 40/30*    (2020.01)

(56) References Cited

U.S. PATENT DOCUMENTS

| | | | |
|---|---|---|---|
| 10,657,572 | B2 | 5/2020 | Kumar et al. |
| 10,776,407 | B2 | 9/2020 | Tomkins et al. |
| 11,157,490 | B2 | 10/2021 | Zhu et al. |
| 11,302,330 | B2 | 4/2022 | Ge et al. |
| 2004/0049499 | A1* | 3/2004 | Nomoto ............... G06F 16/3329 |
| 2013/0246049 | A1* | 9/2013 | Mirhaji ............... G06F 40/284 704/9 |
| 2015/0310115 | A1* | 10/2015 | Ryger ............... G06F 16/9535 707/708 |
| 2019/0065576 | A1* | 2/2019 | Peng ............... G06F 16/285 |
| 2019/0317994 | A1* | 10/2019 | Singh ............... G06F 40/30 |
| 2020/0012697 | A1* | 1/2020 | Fan ............... G06N 20/00 |
| 2020/0034722 | A1* | 1/2020 | Oh ............... G06N 3/084 |
| 2021/0064932 | A1 | 3/2021 | Wang et al. |
| 2021/0311996 | A1* | 10/2021 | Bonin ............... G06F 16/9035 |
| 2021/0319066 | A1* | 10/2021 | Boxwell ............... G06F 40/131 |
| 2023/0053063 | A1* | 2/2023 | Dai ............... G06F 16/9024 |
| 2024/0303236 | A1* | 9/2024 | Andreev ............... G06F 16/2458 |

OTHER PUBLICATIONS

Esteva, A. et al., "COVID-19 information retrieval with deep-learning based semantic search, question answering, and abstractive summarization," NPJ Digital Medicine, Apr. 12, 2021, vol. 4, No. 1, pp. 1-9.

Lewis, P., et al., "Retrieval-augmented generation for knowledge-intensive NLP Tasks," Advances in Neural Information Processing Systems, 33, pp. 9459-9474.

Guu, K. et al., "REALM: Retrieval-Augmented Language Model Pre," arXiv: 2002.08909v1 [cs.CL], Feb. 2020, 12 pg.

Shuster, K et al., "Language models that seek for knowledge: Modular search & generation for dialogue and prompt completion," arXiv preprint arXiv:2203.13224, Mar. 24, 2022, 21 pg.

Adolphs, L. et al., "Reason first, then respond: Modular generation for knowledge-infused dialogue," arXiv preprint arXiv:2111.05204. Nov. 9, 2021, 20 pg.

Thoppilan, R. et al., "Lamda: Language models for dialog applications," arXiv preprint arXiv:2201.08239, Jan. 20, 2022, 47 pg.

Nakano, R. et al., "WebGPT: Browser-assisted question-answering with human feedback," arXiv preprint arXiv:2112.09332, Dec. 17, 2021, 32 pg.

Petroni, F, et al., "How context affects language models' factual predictions," arXiv preprint arXiv:2005.04611. May 10, 2020, 2020, 15 pg.

Gaur, M. et al., "Iseeq: Information seeking question generation using dynamic meta-information retrieval and knowledge graphs," In Proceedings of the AAAI Conference on Artificial Intelligence, Jun. 28, 2022, vol. 36, No. 10, pp. 10672-10680.

\* cited by examiner

DYNAMIC QUESTION GENERATION FOR INFORMATION-GATHERING

CROSS-REFERENCE TO RELATED APPLICATIONS

This application claims the benefit of U.S. Provisional Patent Application No. 63/231,025 filed on Aug. 9, 2021, which is incorporated herein by reference in its entirety.

TECHNICAL FIELD

This disclosure relates to human-machine interaction systems, and more particularly, to machine-implemented conversational artificial intelligence (AI) agents capable of engaging in natural language conversations with human users.

BACKGROUND

Conversational AI encompasses technologies that enable devices and software applications such as chatbots, conversational agents, and the like to converse with humans using natural languages. Conversational agents tend to have greater capabilities than more conventional chatbots. Utilizing deep learning and natural language understanding, conversational agents can increase their artificial intelligence over time through data generated and insights acquired from conversations with a human user. Conversational information seeking (CIS) is a relatively new research area within conversational AI. The goal of CIS is to enable a conversational agent to seek information by automatically generating information-gathering questions that, during a dialogue or conversation with a user, elicit responses that provide information with which the conversational agent can better understand and address the user's needs and/or goals.

SUMMARY

In an example implementation, a computer-implemented method of automatically generating information-gathering questions in response to a user query can include extracting one or more phrases from the user query, the one or more phrases corresponding to a predetermined category and identified by parsing the user query using natural language processing. The method can include accessing a predetermined knowledge database and extracting entities therefrom, the extracted entities being ones semantically related to the one or more phrases. The method can include generating a query sub-graph representing a relationship between each of the one or more phrases and entities extracted from the knowledge database. The method can include traversing the query sub-graph, and based on the traversing, generating an expanded user query. The method can include retrieving from a passages database a plurality of passages that are semantically related to the expanded user query and ranking each of the plurality of passages. The method can include outputting a set of information-gathering questions generated with a neural question generator based on the expanded user query and a group of select passages, each of the group of passages selected from the plurality of passages based on each passage's ranking.

In another example implementation, a system for generating information-gathering questions in response to a user query includes a processor configured to initiate operations. The operations can include extracting one or more phrases from the user query, the one or more phrases corresponding to a predetermined category and identified by parsing the user query using natural language processing. The operations can include accessing a predetermined knowledge database and extracting entities therefrom, the extracted entities being ones semantically related to the one or more phrases. The operations can include generating a query sub-graph representing a relationship between each of the one or more phrases and entities extracted from the knowledge database. The operations can include traversing the query sub-graph, and based on the traversing, generating an expanded user query. The operations can include retrieving from a passages database a plurality of passages that are semantically related to the expanded user query and ranking each of the plurality of passages. The operations can include outputting a set of information-gathering questions generated with a neural question generator based on the expanded user query and a group of select passages, each of the group of passages selected from the plurality of passages based on each passage's ranking.

In another example implementation, a computer program product includes one or more computer readable storage media, and program instructions collectively stored on the one or more computer readable storage media. The program instructions are executable by computer hardware to initiate operations. The operations can include extracting one or more phrases from the user query, the one or more phrases corresponding to a predetermined category and identified by parsing the user query using natural language processing. The operations can include accessing a predetermined knowledge database and extracting entities therefrom, the extracted entities being ones semantically related to the one or more phrases. The operations can include generating a query sub-graph representing a relationship between each of the one or more phrases and entities extracted from the knowledge database. The operations can include traversing the query sub-graph, and based on the traversing, generating an expanded user query. The operations can include retrieving from a passages database a plurality of passages that are semantically related to the expanded user query and ranking each of the plurality of passages. The operations can include outputting a set of information-gathering questions generated with a neural question generator based on the expanded user query and a group of select passages, each of the group of passages selected from the plurality of passages based on each passage's ranking.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the implementations shown. Various aspects and advantages will become apparent upon review of the following detailed description and upon reference to the drawings.

DETAILED DESCRIPTION

Figure 1:
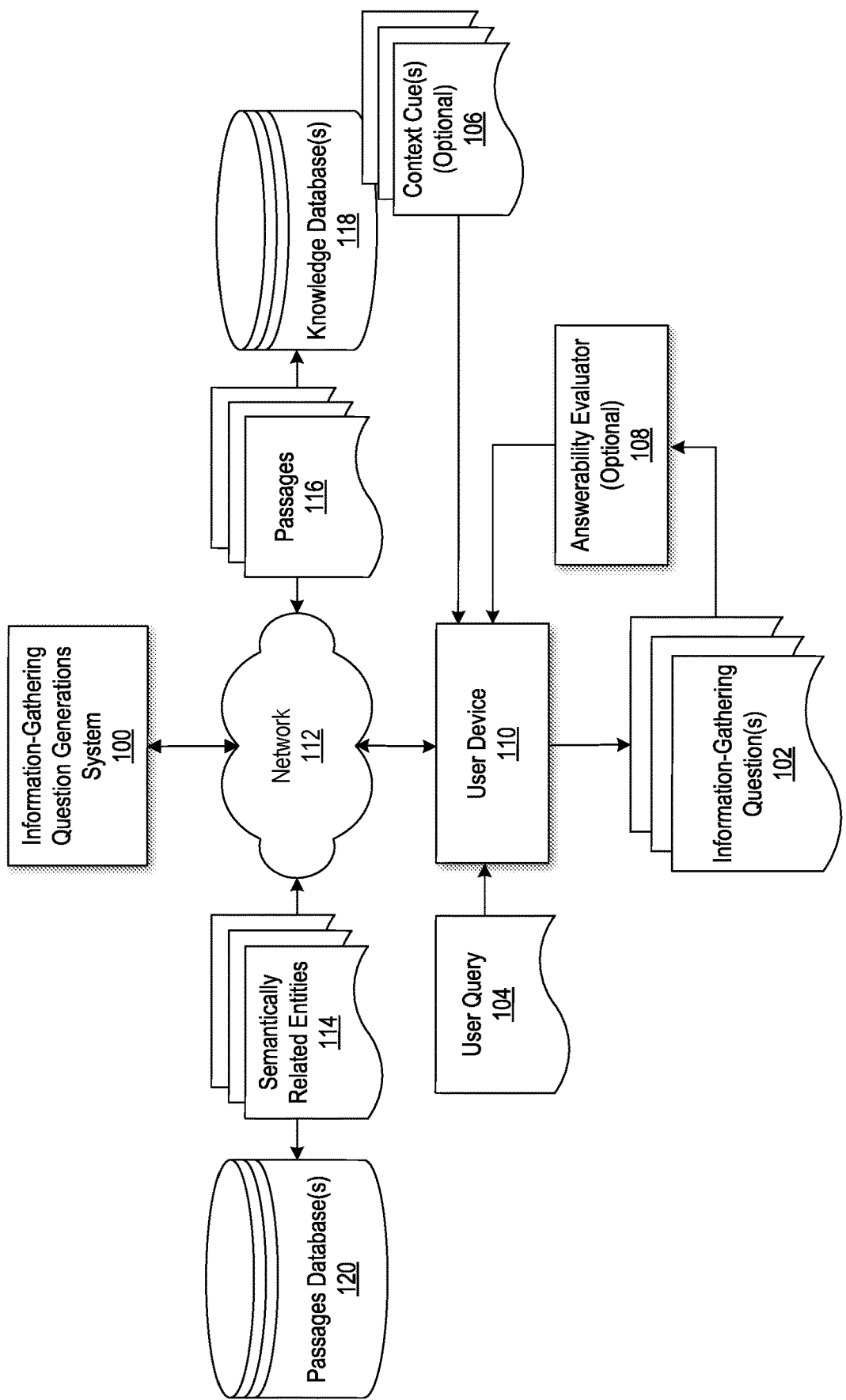
FIG. 1 illustrates an example information-gathering question generation system configured to respond dynamically to user input by automatically generating information-gathering questions that elicit information pertaining to the input.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to human-computer interaction systems, and more particularly, to machine-implemented conversational AI programs and devices capable of engaging in natural language conversations with human users. Training an AI-endowed device to present information-gathering questions to a user during a dialog can be a considerable benefit. Information-gathering questions generated in response to a user query can reveal what information is important to the user, allowing a better machine-generated response to the user query.

As used herein, "user query" is a user-generated statement. The user query can be a word, phrase, or sentence. The statement can be a text or a voice utterance. The statement need not be in the form of an explicit question to be a user query. A declarative statement also can be a user query. Accordingly, a statement such as "tell me about the recent elections in country X" is a user query. A statement such as "I'm feeling depressed" likewise can be a user query, implicitly suggesting in a mental health context that the user is interested in a diagnosis, a possible treatment, or perhaps background information on mental depression. Such indirect queries highlight the fact that often a user query is at least to some degree ambiguous. When made during a human-machine conversation or dialogue, it is often critical to resolve such ambiguity. Even if a user query is unambiguous, it may not completely convey what the user is interested in, what the user wishes to know. Machine-generated questions posed to the user—that is, information-gathering questions—can elicit user responses that clarify the user's intent.

The closer the information-gathering question's semantic relation is to the user query, the more likely question is to elicit a user response revealing the user's intent. Posing a sequence of information-gathering questions is often preferable to a single question. The questions, however, should share certain attributes. The sequence should comprise questions that are not only semantically related to the user query but that also are coherently interrelated and presented in a logical order to provide a semantic conceptual flow. Moreover, it is better if the sequence is devoid of redundant information-gathering questions.

Many if not most existing AI systems do not simultaneously satisfy all these criteria in generating information-gathering questions during a human-machine conversation. Context insensitivity, redundancy, irrelevancy, and "hallucination" (getting off track) are challenges that continue to one degree or another to plague many AI systems, including ones based on deep generative language models. Existing systems tend to work reasonably well for single turn question-response generation but typically do not facilitate a human-machine dialogue aimed at determining the human user's intent or specific information needs. Systems that use deep generative language models tend not to adapt well to domain-specific environments (e.g., generating healthcare-related questions). Such systems generate information-gathering questions with terms extracted from a user query, but often with considerable redundancy. Such systems can be augmented with a mechanism to reduce redundancy, but the systems nevertheless remain prone to generating information-gathering questions that are irrelevant. There is thus a continuing need for an approach that can control the context of machine-generated questions, evaluate the questions for relevancy, reduce redundancy, and maintain a logical ordering in presenting the questions to the user in a contextual flow.

In accordance with the inventive arrangements described herein, example methods, systems, and computer program products are provided that are capable of responding to a user query by generating logically coherent and semantically related information-gathering questions. The information-gathering questions are machine-generated to elicit user responses that reveal more precisely what the underlying intent of user query is—what it is that the user wants to know or a result the user wants to achieve through the human-machine interaction.

One aspect of the inventive arrangements is a knowledge-augmented deep learning-based system that learns to generate information-gathering questions through reinforcement learning using a generative adversarial network. The system generates an expanded user query using a query sub-graph that the system creates by parsing a user's query and extracting phrases (e.g., noun phrases) from the user query. The system expands a query sub-graph using knowledge extracted from a knowledge graph. Accordingly, the system is capable of generating a knowledge-augmented query sub-graph that incorporates similar properties as those that characterize the knowledge graph but are contextualized in accordance with the user query. Differently sourced knowledge graphs (e.g., large-sized knowledge graphs) can be used by the system singly or in combination in accordance with the system's task. For example, ConceptNet can be used for commonsense knowledge, WordNet for lexical knowledge, DBpedia for general knowledge, or a source such as the Diagnostic Statistical Manual for Mental Health Disorders (DSM-5) for domain-specific knowledge in the context of mental health. Such knowledge graphs provide a structured knowledge base comprising data structures that represent knowledge as triplets in which entities (nodes) are connected by relationships (edges). Using the query sub-graph, the system is capable of generating an expanded user query. The system can retrieve passages relevant to the user query from various data sources (passages databases). The passages retrieved are ones that the system determines are semantically related to the expanded user query.

Another aspect is a generative adversarial reinforcement learning network that controls the generation of information-gathering questions based on the expanded user query and retrieved passages. The generative adversarial reinforcement learning network is composed of a neural generative language model and a neural evaluator language model. A novel loss function is introduced into the generative adversarial reinforcement learning network. The loss function is designed to ensure that the system generates information-gathering questions that reflect a correct balance between entities (phrases and phrase sub-words) extracted from the user query and the expanded user query. The generative adversarial reinforcement learning network also is capable of ensuring textual entailment. The entailment enforces a conceptual flow or logical ordering between two consecutive information-gathering questions. "Entailment," is user herein to connote a pair of sentences in which the truth of one implies the truth of the other. If an information-gathering question repeats or contradicts another, then system marks both as "adversarial." Thus, ensuring textual entailment also means that one sentence does not contradict or merely repeat another.

A novel reward function is introduced into the neural evaluator language model. Using the novel reward function, the neural evaluator language model computes a reward earned by the neural generative language model according to whether a generated information-gathering question includes entities identical or semantically close to ones comprising a human-specified ground truth, while maintaining a logical flow with respect to previously generated information-gathering questions.

Yet another aspect, is the optional use of conversational cues (e.g., keywords). The system is capable of further enhancing the query sub-graph using additional user input in the form of conversational cues. Augmenting the query sub-graph with the user-supplied conversational cues can enable the system to generate information-gathering questions that are more likely to elicit user responses that correctly reveal the underlying intent of the user's query, Existing conversational systems that include a mechanism for retrieving passages to generate information-gathering questions depend considerably on a user's ability to provide a complete context for a query. If the user query is ill-posed, an existing conversational system likely refines the query iteratively based on user feedback. In refining the query, the existing conversational system adjusts a passage retrieval mechanism, but typically does so without measuring the contextual drift that is likely to occur between earlier generated questions and latter generated ones. In contrast, passage retrieval using the inventive arrangements disclosed herein mitigates contextual drift by controlling passage retrieval using the query sub-graph. The query sub-graph is constructed from an appropriate knowledge graph, and being knowledge based, provides the necessary context for ensuring the relevancy of the passages retrieved. The retrieval does not require iterative user query refinement and repeated passage retrievals.

While existing systems work reasonably well for single-turn question-and-response interactions, the existing systems tend to generate incoherent, redundant, and/or irrelevant information-gathering questions during a dialogue with a user. The inventive arrangements disclosed herein, by contrast, ensure that information-gathering questions generated during a human-machine dialogue are semantically related both to the user query and to each other, without redundancy, and are presented in a logical sequence. Semantic relatedness is achieved using the novel reward function that ensures that information-gathering questions are generated based on contextual relatedness to entities (phrases and sub-words) extracted from the user query. Logical ordering is achieved by enforcing entailment so that an order sequence is devoid of adversarial information-gathering questions.

An advantage of the inventive arrangements is an ability to generate information-gathering questions of varied lengths in the context of different domains. The different domains include, for example, healthcare, mental evaluation, geography, politics and policy, current events, and the like. The inventive arrangements do not iteratively refine a user query or repeat passage retrieval, but rather performs a single shot information-gathering question generation.

In accordance with the inventive arrangements described above, information-gathering questions are generated using a language model trained through generative adversarial reinforcement learning. As described, the novel reward function trains the model by rewarding its generation of a conceptually ordered sequence of questions exhibiting logical agreement. A system using the model to generate information-gathering questions can be used, for example, to generate safety-constrained and/or process-guided questions with critical applications, such as risk assessment, patient triaging, and the like.

Moreover, a system trained according to the inventive arrangements disclosed herein is transferable across similar domains if the source of the passages retrieved is the same. For example, if the system is trained with a general knowledge passage source (e.g., Wikipedia), the system can generate information-gathering questions pertaining to a wide array of topics (e.g., history, geography, politics). Likewise, the system can be used for generating information-gathering questions pertaining to a specialized topic such as mental health using a domain-specific source such as the Structured Clinical Interviews in the DSM-5 (SCID). In the latter case, the system can respond to user queries involving depression, anxiety, and other mental health queries after being trained using disorder-specific clinical questionnaires presented in the SCID. The system self-learns. The system is adaptive with respect to various tasks and is readily task-transferable with few queries and a task-relevant passages database. Accordingly, the system is capable of learning to generate information-gathering questions without a training dataset.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example information-gathering question generation system (system) 100. System 100 is capable of automatically generating one or more information-gathering questions (IGQs) 102 in response to user query 104. IGQs 102, as generated by system 100, can comprise an ordered sequence of logically coherent and semantically related questions that are likely to elicit explicit and cohesive responses from a user. Responses to IGQs 102 thus can provide information that enables system 100 to ascertain the user's intent and/or motivation in posing user query 104.

This facilitates an AI-based, knowledge-augmented human-machine conversation with the user. Optionally, in some arrangements, system 100 can refine IGQs 102 in response to one or more user-supplied context cues (e.g., keywords) 106, as described below. System 100 in other arrangements optionally includes or operatively couples with answerability evaluator 108, which, as also described below, enables system 100 to refine IGQs 102 to determine the likely state of the user's present knowledge.

System 100 can operate as a conversational agent or other AI-endowed entity implemented in hardware and/or software operating on a computing device. The computing device can be a single computer, such as a network server, or multiple computers that communicatively couple with one another. Illustratively, system 100 is implemented in a computing device that communicatively couples with user device 110 via network 112 to which each connects through a wired or wireless connection. User device 110 can be a computer, laptop, tablet, smartphone, smartwatch, smart glasses, or other such device. Network 112 can include the Internet, a wide area network, local area network, and/or other data communications network.

Operatively, in certain arrangements, system 100 generates IGQs 102 by generating an expanded user query based on a knowledge-based query sub-graph created from semantically related entities 114 of a knowledge graph. Using the expanded user query, system 100 identifies passages 116 that are semantically similar to the expanded user query. System 100 includes a novel reward-and-loss-based generative adversarial machine learning network that generates IGQs 102 based on semantically related entities 114 and passages 116. Illustratively, in FIG. 1, system 100 communicatively couples via network 112 to one or more knowledge databases 118 from which system 100 extracts semantically related entities 114. Knowledge database(s) 118 can comprise one or more indexed knowledge databases, such as ConceptNet, WordNet, DBpedia, and the like, including domain-specific ones such as DSM-5. System 100 illustratively also connects via network 112 to one or more passage databases 120 from which system 100 retrieves passages 116. In other arrangements, one or both of knowledge database(s) 114 and passages database(s) 120 can be integrated in system 100.

Operating as a conversational agent or other AI-endowed entity, system 100 can be adapted to various tasks. In certain arrangements, system 100 can operate, for example, as a general-purpose conversational agent capable of providing a broad range of responses (e.g., general information) in response to a user query. To understand the user's intent (e.g., what the user wants to know), system 100 generates IGQs 102. System 100 can present IGQs 102 to the user via a user device to elicit responses which reveal the user's intent. In other contexts, IGQs 102—which, as noted, are generated by system 100 automatically using one or more language models described below—are not directly presented to the user but rather are used by system 100. Rather than presentment to a user, system 100 itself can use IGQs 102 to ensure the conceptual flow of a conversation with the user by enforcing the logical order of system-generated responses.

For example, in a domain-specific context such as mental healthcare, system 100 can use expert-defined questions (e.g., Patient Health Questionnaire (PHQ)—9) to generate a cohesive response to user query 102. Without the logical order, a conversation can get off track (characterized as hallucination), which in a specific context such as mental healthcare can have adverse consequences. For instance, a question such as "what do you do when you feel depressed?" followed by "do you like it?" is an example of illogical ordering. System 100 can provide such a series of system-generated questions to a clinician or other mental health expert if needed, but if presented to the user, the ill-ordering could adversely affect the human-machine interaction. The training of system 100 (operating, for example, as a conversational agent or chatbot) can be performed with a dataset of questions and user scenarios, where the questions are obtained from SCID, PHQ-9 and paraphrased to increase the quantity of questions available for training.

Figure 2:
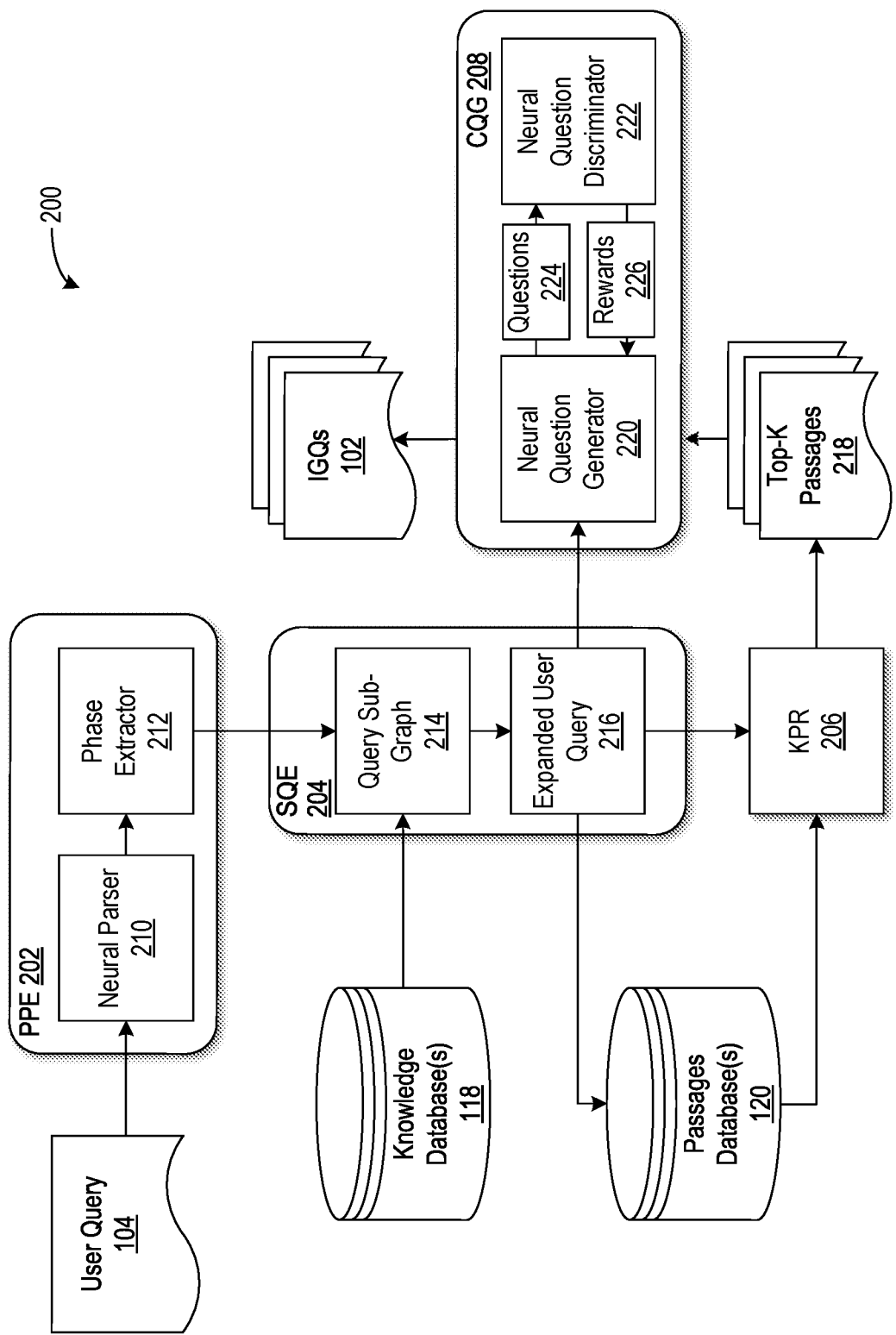
FIG. 2 illustrates an example architecture for an information-gathering question generation system configured to automatically generate information-gathering questions.

FIG. 2 illustrates example architecture 200 for an information-gathering question generation system. Architecture 200 may be used to implement system 100 of FIG. 1. In various arrangements, architecture 200 may be implemented in hardware (e.g., as dedicated circuitry), software (e.g., program code executed by one or more processors), or a combination thereof. Illustratively, architecture 200 includes parser and phrase extractor (PPE) 202, structured query expander (SQE) 204, knowledge-aware passage retriever (KPR) 206, and conversational question generator (CQG) 208.

PPE 202 of example architecture 200 is capable of identifying certain types of phrases comprising user query 104, and based on the identifying, extracting the phrases from user query 104. As defined herein, "phrase" means a group of syntactically related words and/or an individual word ("sub-word"). The phrases can correspond to one or more predetermined categories. A predetermined category can be a linguistic category (e.g., noun phrases). A predetermined category can include common-sense and/or domain-specific knowledge categories. In certain arrangements, PPE 202 is configured to extract phrases characterized linguistically as noun phrases.

PPE 202 illustratively includes parser 210. Parser 210 can be configured as a constituency parser. The constituency parser can be implemented as a self-attentive bi-directional encoder-decoder parser. For example, in certain arrangements, parser 210 implements a version of Berkeley Neural Parser, which infers syntactical annotations (e.g., parts of speech) using neural networks and self-attention (a mechanism described below). Thus, in implementing constituency parsing, parser 210 can identify phrases within user query 104 based on identifying the parts of speech of user query 104. PPE 202 of example architecture 200 also illustratively includes phrase extractor 212, which extracts phrases (e.g., noun phrases) identified by parser 210. As defined herein, "extracting" means creating a data structure specifying the phrase so that the phrase exists independently and distinctly apart from the data from which the phrase was extracted. For example, the data structure can be a numerical encoding of a phrase with which the phrase is represented as a vector, matrix, or higher-dimension tensor.

SQE 204 of example architecture 200 is capable of generating query sub-graph 214 based on the extracted phrases and semantically related entities of one or more knowledge graphs obtained from knowledge database(s) 118. A knowledge graph is a machine-readable data structure comprising edge-connected nodes and named relationships. The nodes can correspond to words and phrases of natural language, collected from various sources, and connected by labeled edges. A knowledge graph, depending on the words and phrases, provides a source of meta-information (knowledge) that, as a machine-readable data structure, can be used in a computing environment to enhance natural language understanding. Knowledge can be structured as linked triplets, each comprising a subject, predicate, and object. Thus, SQE 204 can be configured to utilize different types of machine-executable knowledge by using different knowledge graphs from one or more knowledge database(s) 118. Using ConceptNet, for example, SQE 204 can acquire a knowledge graph of commonsense knowledge. SQE 204 can acquire a knowledge graph of general knowledge using DBpedia, for example. Using, for example, WordNet or LIWC, SQE 204 can acquire linguistic knowledge. In other instances, for example, SQE 204 can utilize domain-specific knowledge acquired from a domain-specific knowledge database. For example, in the context of generating conversational questions pertaining to mental health, SQE 204 can utilize a knowledge graph, such as the DSM-5 comprising the lexicon of mental health terms. The knowledge graph used by SQE 204, as described more fully below, can be enhanced by contextual cues of the user.

Query sub-graph 214 comprises entities occurring in both user query 104 and entities appearing in the knowledge graph accessed through knowledge database(s) 118. User query entities are phrases (e.g., noun phrase or sub-word) extracted from user query 104. Knowledge graph entities are knowledge graph triplets that SQE 204 determines are semantically related to the user query entities. In one arrangement, SQE 204 identifies semantically related knowledge graph entities by recognizing a subject or an object in a knowledge graph triplet that is identical or similar to one in a phrase extracted from user query 104. In other arrangements, SQE 204 identifies semantically related knowledge graph entities based on a similarity-based metric. An example similarity-based metric is cosine similarity, which SQE 204 determines by performing a sequence-to-sequence encoding (e.g., using sentence-BERT) to generate an embedding of each knowledge graph entity and computing each embedding's cosine similarity to a phrase extracted from user query 104. A knowledge graph entity whose cosine similarity with an extracted phrase exceeds a predetermined threshold (e.g., 0.6) is marked as semantically related by SQE 204.

SQE 204 can be configured to extract the semantically related entities from one or more diverse knowledge graphs accessed through knowledge database(s) 118. In some arrangements, SQE 204 is configured to extract semantically related knowledge graph entities by performing a multi-hop extraction of marked entities (subject-relation-object triplets) during a depth-first graph traversal of each diverse knowledge graph. SQE 204 appends the extracted entities to entities of a knowledge graph of user query 104 to generate query sub-graph 214. Expanded user query 216 is generated based on query sub-graph 214.

In certain arrangements, SQE 204 traverses query sub-graph 214. With each traversal of query sub-graph 214, SQE 204 constructs a sentence and appends the sentence to the entity of the user query 104 that triggered the traversal. For example, a first entity of a user query such as "can you name for me a reduced-calorie Italian food?" is "reduced-calorie." SQE 204's expansion of the query generates an expanded path or branch "can you name for me a reduced-calorie (is a low calorie or calorie-restricted) Italian food?" by appending "is a low-calorie or calorie-restricted" to the first entity of the user query. Each path of query sub-graph 214 represents an expanded version of user query 104, in the form of a conversational sentence. Collectively, the sentences comprise the expanded user query 216.

Expanded user query 216 augments user query 104. SQE 204 augments or expands user query 104 by appending entities extracted from knowledge database(s) 118 to entities of a knowledge graph corresponding to user query 104. The resulting paths or branches each form a distinct information-gathering question in the form of a sentence and collectively comprise expanded user query 216. A user query expansion can be especially advantageous, for example, with respect to relatively terse or short user queries. Expanded user query 216 expands user query 104 in a manner that reveals the likely intent of the user (e.g., what the user likely wants to know) and the likely depth needed for an adequate response to the user (e.g., the likely depth of information the user needs). SQE 204 inputs expanded user query 216 to KPR 206.

KPR 206 of example architecture 200 is capable of retrieving knowledge-guided and context-sensitive passages from passages database(s) 120 and ranking the retrieved passages based on their semantic similarity to expanded user query 216. As input to CQG 208, described below, the retrieved passages enhance CQG 208's capability for generating a linguistically and conceptually enriched sequence of conversational questions. Tying KPR 206's retrieval of passages to expanded user query 216 and ranking the retrieved passages based on their semantic similarity to the expanded user query reduces redundancy and synonymity among the information gather questions generated.

In certain arrangements, KPR 206 is configured to determine the semantic similarity by performing a maximum inner product search (MIPS) over passages of passages database(s) 120. In determining semantic similarity, KPR 206 encodes expanded user query 216 as well as the passages, and then determines the cosine similarity between encoded passages and expanded user query 216. Specifically, KPR 206 encodes each passage and each sentence of expanded user query 126 (a path on the query sub-graph) as a vector and computes the cosine based on the inner product of each passage-sentence pair. In certain arrangements, each sentence of expanded user query 216 retrieves a predetermined number of passages (e.g., 20 passages) vectorized and indexed passages from passages database(s) 120. In some arrangements, KPR 206 ranks each passage are ranked according to a MIPS score and selects the top-k (e.g., k=20). KPR 206, in still other arrangements, can select another set of top-k passages in response to determining that previously selected ones do not enable the generation (described below) of information-generating questions that are semantically related, flow conceptually, and do not diverge from user query 104.

For enhanced processing efficiency, KPR 206 can group similar passages into groups prior to performing the MIPS. KPR 206 then need only perform a MIPS with respect to a representative passage of each group rather than all the passages of the group. In certain arrangements, KPR 206 can be configured to group passages using locality-sensitive hashing (LSH). Leveraging an LSH strategy to cluster passages, KPR 206 can select a central passage from each of a predetermined number of clusters. If the central passage of a cluster satisfies a selection criterion (e.g., cosine similarity greater than or equal to 0.6), each passage contained in the cluster is selected as semantically related.

A passage may be semantically related to a number of different sentences of expanded user query 216. The number is a proxy for a passage's relevance to the user's query, providing an indication of what it is that the user likely wants to know. KPR 206, accordingly, can re-rank the retrieved passages based on the proxy for each passage's relevance. KPR 206 re-ranks the retrieved passages to generate top-k passages 218.

Passages are initially ranked by KPR 206 using MIPS and then re-ranked after clustering the passages and selecting the central passage from each cluster. The clustering brings together semantically similar passages after initial retrieval, as MIPS is not configured to perform semantical clustering.

If query sub-graph 214 is enriched in response to user-feedback in the form of conversational cues (e.g., keywords), as described below, then the re-ranked passages are used for generating additional information-gathering questions, as also described below. KPR 206 is also triggered by the user-feedback and responds by retrieving passages semantically related to an enriched expanded user query. This can minimize the turn-around response time to user query 102 and provide a user with a richer conversational experience. Moreover, in accordance with certain arrangements, once KPR 206 has retrieved relevant passages (in background), a language model implemented by CQG 208, below, is also trained (in background). After a session with a user has ended (e.g., culmination of a human-machine conversation), then the language model is updated based on a most recent user-query expansion and passages retrieval.

KPR 206 inputs top-k passages 218 and expanded user query 216 to CQG 208. CQG 208 is capable of generating IGQs 102 automatically in response to user query 104. IGQs 102 are machine-generated and comprise a logically ordered sequence of conversational questions, which based on the inputs, are semantically related to and preserve the context of user query 104. In certain arrangements, CQG 208 is implemented as a generative adversarial network. CQG 208, as a generative adversarial network, comprises a pair of neural networks that compete against one another in a zero-sum game. One neural network is neural question generator 220. The other neural network is neural question evaluator 222. Neural question generator 220 generates information-gathering question candidates ("candidates"). Neural question evaluator 222 evaluates the candidates.

Neural question generator 220 can be implemented as a transformer, that is, a deep learning model, or deep learning-based language model, that incorporates an attention mechanism (self-attention) as an additional layer. In the present context of processing word embeddings, the attention mechanism enables neural question generator 220 to access and weight word tokens of a sentence or phrase according to a learned relevance. The attention mechanism enables neural question generator 220 to assign meaning to words appearing in a latter part of a sentence or phrase by taking into account words appearing earlier. In an example arrangement, neural question generator 220 is implemented using the Text-to-Text Transfer Transformer, or T5, encoder-decoder architecture.

Neural question evaluator 222 improves the performance of neural question generator 220. Neural question evaluator 222 is pretrained to predict whether a question generated by neural question generator 220 is semantically and contextually consistent with top-k passages 218 and expanded user query 216 but not redundant. Operatively, neural question evaluator 222 receives machine-generated questions 224 from neural question generator 220 and generates rewards 226 for machine-generated questions 224 that satisfy neural question evaluator 222's learned criteria. Otherwise, neural question generator 220 incurs a loss or penalty. In an example arrangement, neural question evaluator 222 is implemented using an approach referred to as Efficiently Learning an Encoder that Classifies Token Replacements Accurately, or ELECTRA. In the context of training as a zero-sum game, neural question generator 220 and neural question evaluator 222 learn based on maximizing neural question generator 220's reward. The novel reward function is designed to promote diversity among IGQs 102 generated by neural question generator 220.

In certain arrangements, neural question evaluator 222 fine tunes neural question generator 220 using the novel reward function disclosed herein. The reward function is configured to balance the relative weights (importance) assigned, respectively, to top-k passages 218 and expanded user query 216 as input to CQG 208. The reward function promotes the aforementioned diversity among the IGQs 102. The novel reward function is defined by the following expression:

$$\alpha \left[ \frac{LCS(q_i^n, \hat{q}_i^m)}{|\hat{q}_i^m|} \right] + (1-\alpha) \left[ \Sigma_{\hat{\omega}_{ij} \in \hat{q}_i^m} \max_{\hat{\omega}_{ij} \in \hat{q}_i^m} WMD(\hat{\omega}_{ij}^T, \hat{q}_i^m) \right],$$

where $q_i^n$ is the i-th question in a predetermined ground truth of questions, Q, having n word tokens, and $\hat{q}_i^m$ is the i-the question in a set of machine-generated questions, $\hat{Q}$, produced by neural question generator 220 and having m tokens. The word tokens of $q_i^n$ and $\hat{q}_i^m$, in certain arrangements, can be BERT-encoded question vectors. The term $\alpha[\cdot]$ is a normalized longest common subsequence (LCS) score that captures the word order and enables neural question generator 220 to learn to copy complex information-gathering queries. The term $(1-\alpha)[\cdot]$ uses the Word Mover's Distance (WMD) to measure semantic similarity and compositional diversity of machine-generated questions.

Moreover, textual entailment among the machine-generated questions produced by neural question generator 220 results from the use the novel loss function disclosed herein. Entailment characterizes the semantic dependence between one sentence and another. One sentence is said to entail another if the validity of the one implies the validity of the other. In the present context, the novel loss function disclosed herein fosters entailment, and relatedly, a logical ordering of the sequence of sentences generated by question generator 220. The novel loss function is defined by the following conditional statements for any pair of pair of duplicate machine-generated questions ($\hat{q}_i$, $\hat{q}_j$):

if $\hat{q}_i$ entails $\hat{q}_j$:
    −Reward · $\Pi(q_2 = \hat{q}_2)$ · $\log Pr(\hat{q}_2|\theta) - Pr(\hat{q}_2|\hat{q}_1)$
else
    −Reward · $(1 - \Pi(q_2 = \hat{q}_2))$ · $\log Pr(\hat{q}_2|\theta) - (1 - Pr(\hat{q}_2|\hat{q}_1))$ The conditional probability $\hat{q}_2$ conditional on $\theta$, $Pr(\hat{q}_2|\theta)$, is determined by the equation $$Pr(\hat{q}_2|\theta) = \max_Y RoBERTa_{NLI}((\hat{q}_2, \hat{q}_1),$$

where $\theta$ is a parameter that is learned through the machine earning that trains neural question generator 220 and neural discriminator 222 of CQG 208. RoBERTa is a modification of the machine learning used to train BERT models. The modifications include longer training using larger batches, removal of the next-sentence prediction, training on longer word sequences, and dynamically changing the masking pattern applied to the training data. The argument with respect to which RoBERTa is maximized for determining the conditional probability is $Y \in \{$entailment, neutral, contradiction$\}$.

Assuming a generated question comprises m tokens and b is the number of questions generated by the system—that is, b is the total number of questions corresponding to ground truth—then a Cross Entropy Loss function is formulated as $$\frac{-\sum_{i=1}^{b} Reward_i \cdot \prod (q_i^n = \hat{q}_i^m) \cdot \log Pr(\hat{q}_i^m | \theta)}{b},$$

and a Reverse Cross Entropy Loss function is formulated as $$\frac{-\sum_{i=1}^{b} Reward_i \cdot (1 - \prod (q_i^n = \hat{q}_i^m)) \cdot \log Pr(\hat{q}_i^m | \theta)}{b}.$$

The parameter b, in certain arrangements, can also correspond to a window (different from batch size) of questions that the neural question generator 220 processes to control the quality of the information-gathering questions. The loss per machine-generated query with b ground truth information-gathering questions is a conditional loss, as determined by the above equations. A dataset used to train the generative adversarial network implemented by CQG 208 can comprise diverse queries that mimic human information-gathering behavior. Accordingly, for each of the t training epochs, loss $\mathcal{L}(Q | Q, \theta)_t$ can be computed as follows:

$$\mathcal{L}(Q | Q, \theta)_t = r \mathcal{L}(Q | Q, \theta)_{t-1} + (1 - r) \mathcal{L}(\hat{q}_{1:b} | q_{1:b}, \theta)$$

where $r$ is a tunable hyperparameter and the additive loss term depends on whether a user query is a "hard to answer" or "easy to answer" query. If $r$ is set high, then the model continues to learn by ignoring "hard to answer" queries and a low setting introduces a loss computation from user queries for which the generated questions do not match user expectations.

More generally, neural question evaluator 222 can be configured to compute a reward according to whether the information-gathering questions generated by neural question generator 220 include entities identical to or similar with the human-specified ground truth. The reward values fine tune neural question generator 220. The rewards enable neural question generator 220 to self-learn by guiding neural question generator 220 in refining a language model, based on which, neural question generator 220 generates information-gathering questions. The loss function scores determined by neural question evaluator 222 re-ranks passages for new information-gathering question generation.

Figure 3:
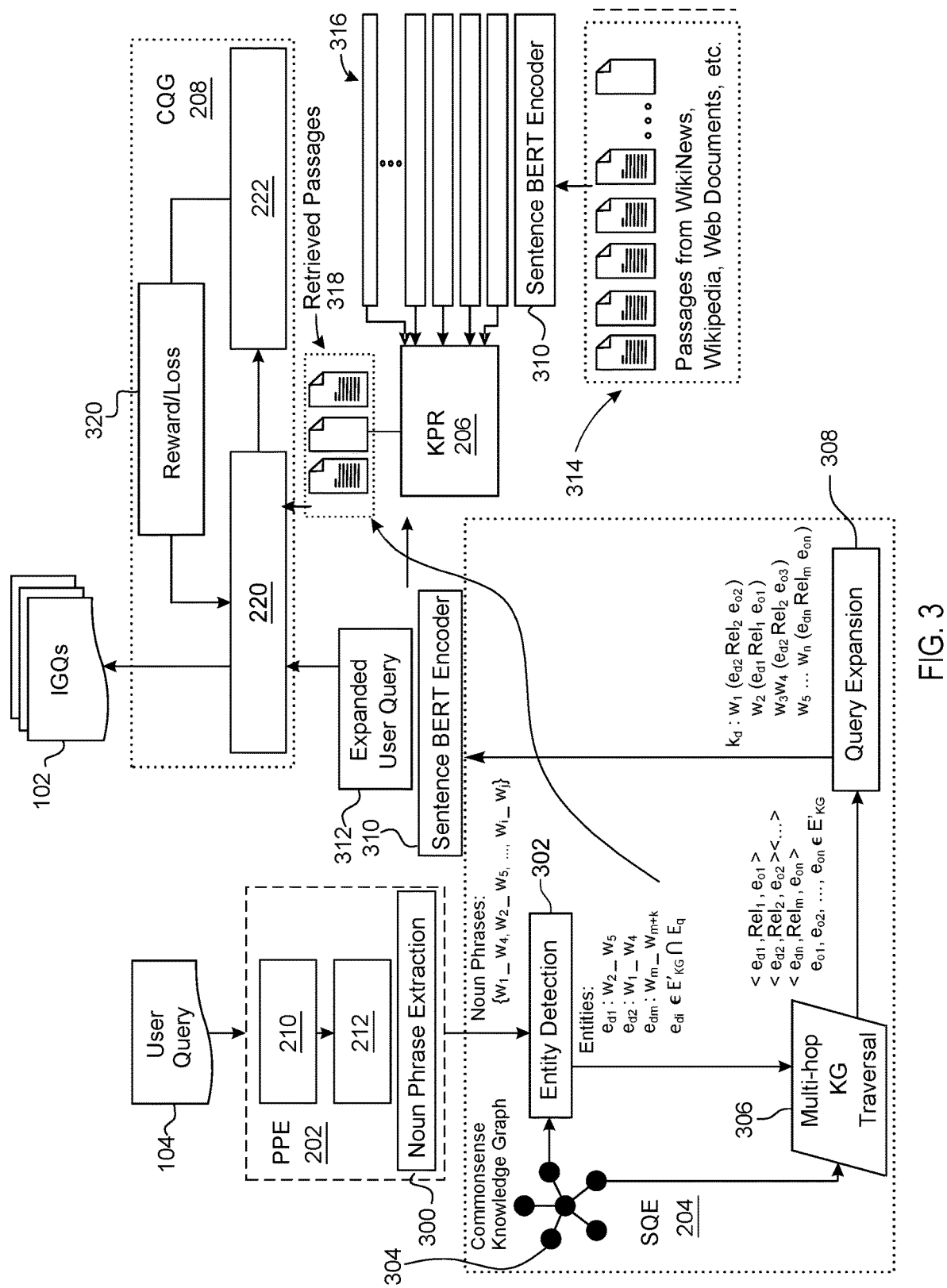
FIG. 3 illustrates certain operative aspects of an example implementation of the information-gathering question generation system described in connection with FIG. 2.

FIG. 3 illustrates certain operative aspects of an example implementation of information-gathering question generation using architecture 200 of FIG. 2. Initially, neural parser 210 of PPE 202 parses user query 104. Phrase extractor 212 performs noun phrase extraction 300, extracting one or more noun phrases from user query 104, which are input to SQE 204. SQE 204 performs entity detection 302 to identify those entities of knowledge graph 304 accessed through knowledge database(s) 118 and determined by SQE 204 to be semantically related to the extracted noun phrases. SQE 204 marks those entities of knowledge graph 304 that are semantically related. In a depth-first search, SQE 204 performs multi-hop traversal 306 of knowledge graph 304 and extracts the marked entities. SQE 204 performs query expansion 308 by appending the extracted entities to a graph of user query 104 to generate an expanded user query. SQE encodes the expanded user query using, for example, sentence BERT encoder 310 to generate encoded expanded user query 312.

SQE 204 inputs encoded expanded user query 312 to KPR 206. KPR 206 retrieves passages 314 from one or more passages database(s) 120 (e.g., WikiNews, Wikipedia, web documents). KPR 206 retrieves passages that KPR 206 determines are semantically similar to the encoded expanded user query 312. KPR 206 encodes the retrieved passages 314 also using, for example, sentence BERT encoder 310 to generate encoded passages 316. KPR 206 ranks encoded passages 316 and inputs top-ranked encoded passages 318 to CQG 208 along with encoded expanded user query 312.

CQG 208 implements the generative adversarial network in which neural question generator 220 is fine-tuned through rewards and losses 320 generated by neural question evaluator 222. Neural question evaluator 222 is trained to distinguish among the questions generated by neural question generator 220. Neural question evaluator 222 rewards machine-generated questions that are contextually and semantically coherent with user query 104 and are not redundant. Accordingly, IGQs 102 generated by neural question generator 220, as fine-tuned by neural question evaluator 222, comprise a set of diverse conversational questions that are semantically coherent with user query 104.

Figure 4:
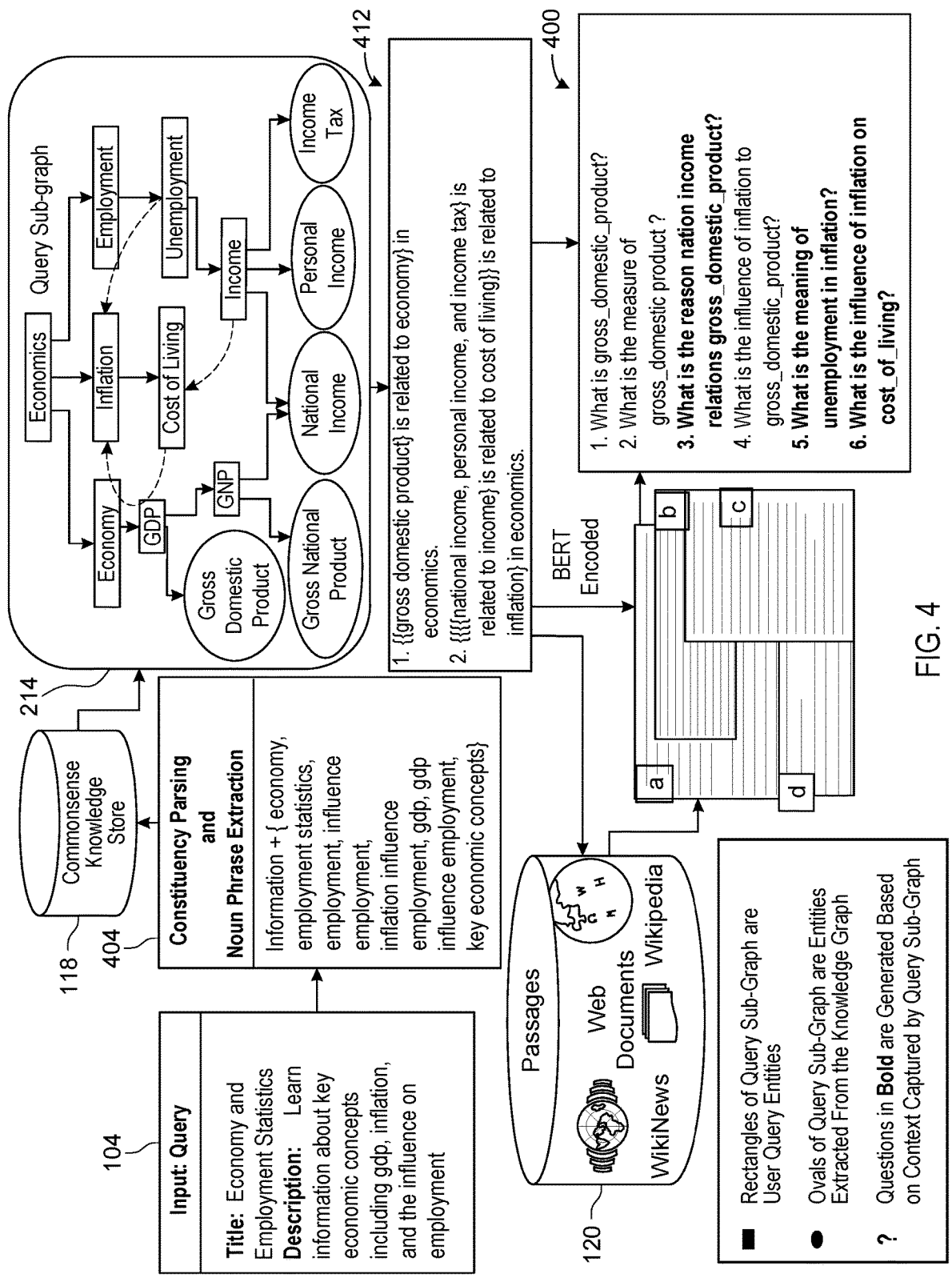
FIG. 4 illustrates an example of automatically generating information-gathering questions in accordance with the inventive arrangements.

FIG. 4 illustrates an example of automatically generating information-gathering questions 400 using a system having the example architecture described in connection with FIG. 2. User query 102 includes a title and description of a topic pertaining generally to economics and specifically to inflation and employment. Neural parser 210 of PPE 200 performs a consistency parsing of user query 102, and based on the parsing, phrase extractor 212 of PPE 200 extracts noun phrases 404. SQE 204 determines which entities of a knowledge graph accessed from knowledge database(s) 118 (e.g., ConceptNet or other indexed knowledge database) are semantically related to noun phrases 404. The semantically related entities (represented as ovals) are extracted and used by SQE 204 to generate query sub-graph 214. KPR 206 retrieves passages a, b, c, and d from passages databases 120 (e.g., WikiNews, Wikipedia, web documents, and the like). Retrieved passages a, b, c, and d are extracted by KPR 206 based on their matching with phrases 412 corresponding to paths of query sub-graph 214. CQG 208, based on phrases 412 and passages a, b, c, and d, generates information-gathering questions 104. Information-gathering questions 104 comprise a set of diverse, non-redundant conversational questions that are coherent—both contextually and semantically—with user query 102.

Figure 5:
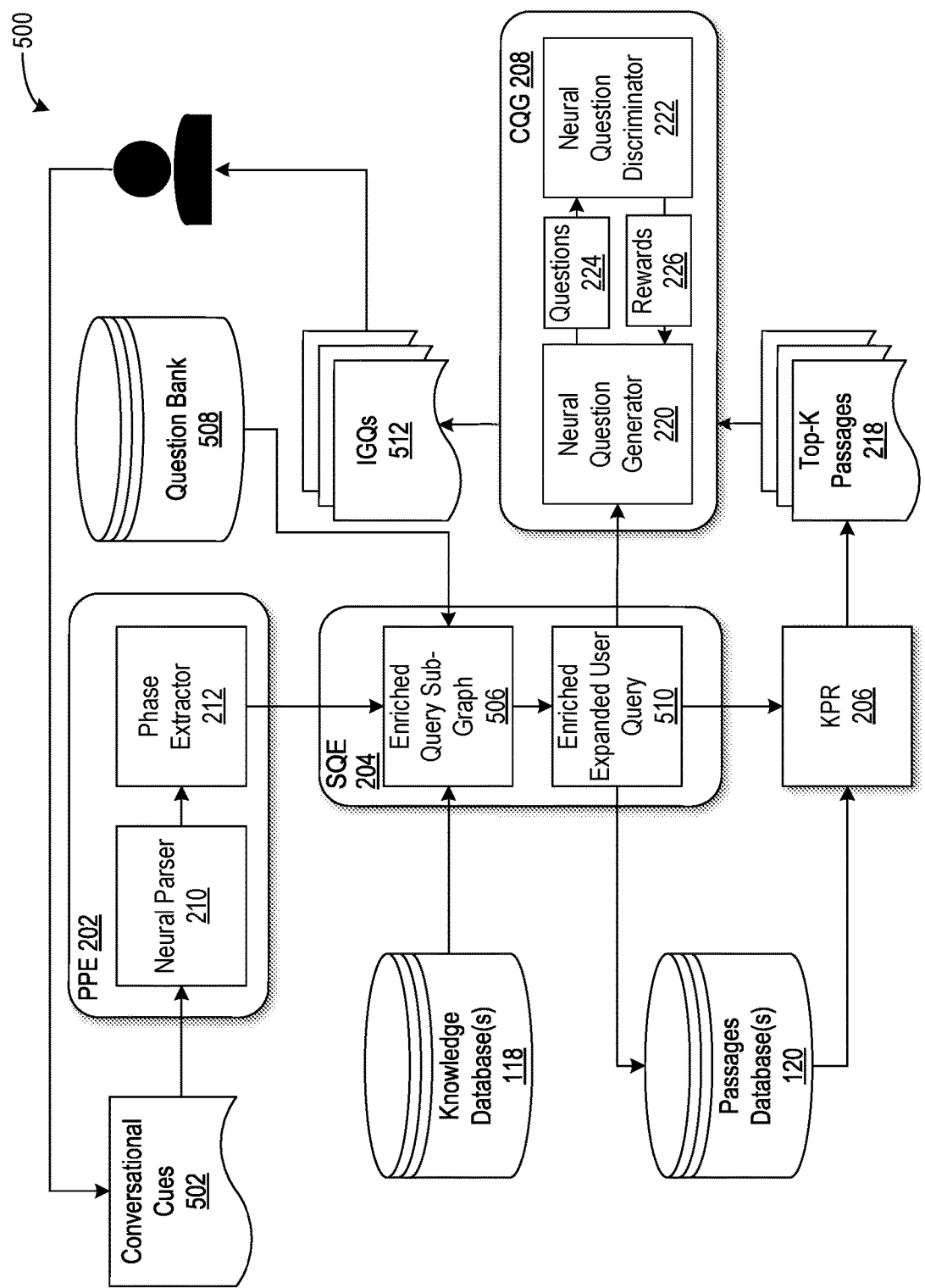
FIG. 5 illustrates another example architecture of an information-gathering question generation system.

FIG. 5 illustrates another example architecture 500 of an information-gathering question generation system. Example architecture 500 is configured to respond to one or more conversational cues 502 received during a conversation with user 504. Conversational cues 502, for example, are keywords. Conversational cue(s) operate as user feedback an adaptive conversation. As defined herein, "adaptive conversation" means a sequence of human-machine utterances (e.g., voice and/or text) in which machine-generate utterances are generated based on, and in response to, conversational cues (e.g., keywords) of the user. The user feedback can be used to generate additional information-gathering questions to refine or supplement IGQs 102 generated in response to user query 104. Each conversational cue supplied by the user can invoke the process of generating one or more additional information-gathering questions that refine or supplement the earlier generated IGQs 102.

A system in accordance with architecture 500 is capable of generating enriched query sub-graph 506 based on conversational cues 502. Architecture 500 includes question bank 508, as well as other components described in connection with architecture 200 in FIG. 2. Question bank 508 includes logically ordered questions corresponding to diverse information-gathering queries. SQE 204 can search question bank 508 to identify existing entities in the query sub-graph through entity-entity similarities or the presence of relationships between conversational cues 502 (e.g., keywords) and entities (e.g., synonyms, hyponyms, meronymy) stored in question bank 508. If there are no such related entities in question bank 508, SQE 204 can perform the processes described in connection with architecture 200 and use one or more conversational cues 502 to generate enriched query sub-graph 506. Using enriched query sub-graph 506, SQE 204 can generate enriched expanded query 510. Enriched expanded query 510 is processed by KPR 206 and CQG 208 as already described for generating IGQs 512, which is likewise enriched through by enriched expanded query 510. Thus, for example, the system (e.g., conversational agent) configured in accordance with architecture 500, is able to respond when unable to provide appropriate and complete information to a user. Based on one or more conversational cues 502 from the user, the system is able to enrich the query sub-graph generated by SQE 204. Using the enriched query sub-graph, the system further refines one or more newly generated information-gathering questions based on conversational cue(s) 502 (e.g., keywords).

Figure 6:
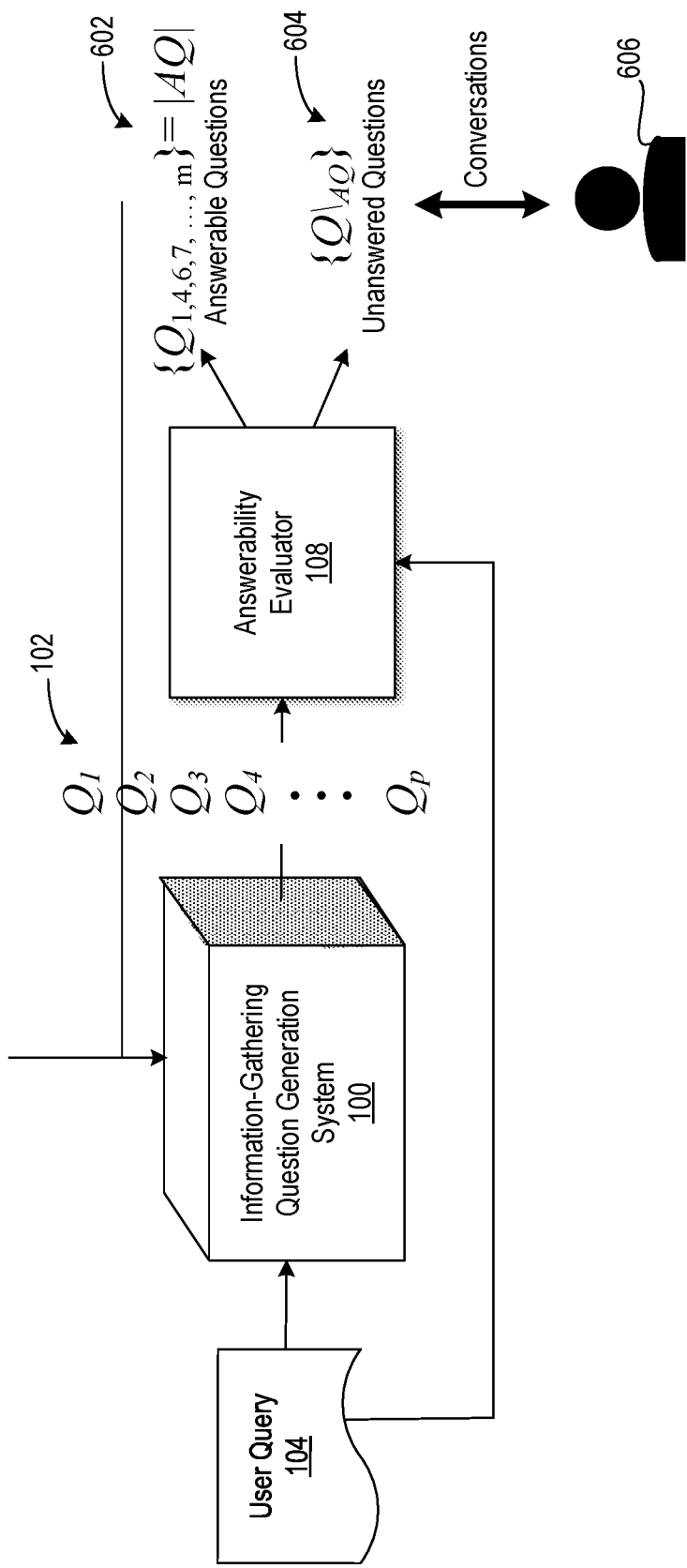
FIG. 6 illustrates certain operative features of the system of FIG. 1 in which the system includes an answerability evaluator.

FIG. 6 illustrates certain operative features of system 100 using answerability evaluator 108 shown in FIG. 1 as an optional component. Illustratively, system 100 communicatively couples with answerability evaluator 108 (e.g., over a data communications network via wired or wireless connections), which is separate from the other components of system 100. In other arrangements, however, answerability evaluator 108 can be integrated in a single device (e.g., computer, server) along with each of the other components of system 100. Operatively, answerability evaluator 108 is configured to perform multiple functions with respect to IGQs 102 generated by system 100. Answerability evaluator determines which information-gathering questions among question sequence 600 generated by system 100 can be answered using information given in a user's query (answerable questions 602) and one or more which cannot be (unanswered questions 604). Answerability evaluator 108 can be configured to actuate system 100 to generate and convey to a user (e.g., via a user device) a prompt. The prompt can request the user to provide conversation cues (e.g., keywords) based on which the system can generate one or more questions that substitute for the one or more unanswered questions 604.

Answerability evaluator 108 enables system 100 to sense whether user query 102 is immediately answerable. If answerability evaluator 108 determines that it is not, system 100 can automatically respond by a further generation of additional information-gathering questions. The added functionality provided by answerability evaluator 108 can prevent system 100's generation of redundant information-gathering questions in response to other similar user queries. In the context of mental health or similar type applications, for example, system 100 can match a user query to an expert-defined questionnaire.

Figure 7:
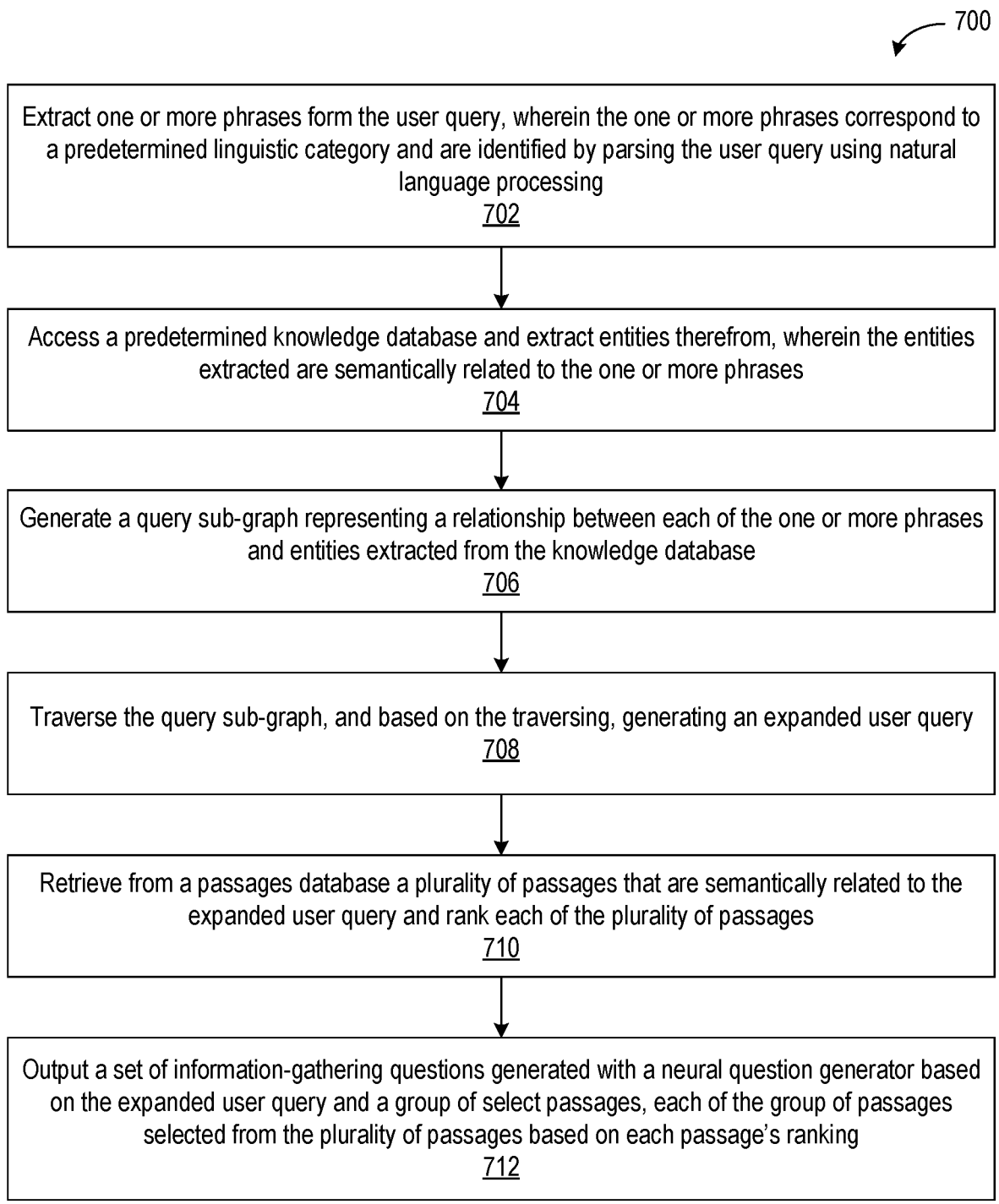
FIG. 7 is a flowchart of an example method of automatically generating information-gathering questions in response to a user query.

FIG. 7 illustrates an example method 700 of automatically generating information-gathering questions during a human-machine conversation or dialogue. Method 700 can be performed by a device including an information-gathering question generator system, referred to herein, collectively, as "the system," as described herein in connection with FIGS. 1-6.

At block 702, the system extracts one or more phrases from a user query. The one or more phrases can correspond to a predetermined linguistic category, such as noun phrases. The system can identify the one or more phrases by parsing the user query using natural language processing.

At block 704, the system accesses a predetermined knowledge database. The database can be any of various knowledge databases (e.g., ConceptNet, WordNet, DBpedia, DSM-5). The database can be selected in accordance with the task that the system is to perform. For performing various tasks, the system can deployed for general-purpose information searches, providing healthcare information, mental healthcare triaging, and other for other purposes. The system can extract from the knowledge database one or more entities that the system determines are semantically related to the one or more phrases extracted from the user query.

At block 706 the system can generate a query sub-graph that represents the relationship between each of the one or more phrases and entities that the system extracted from the knowledge database.

At block 708, the system can traverse the query sub-graph. Based on the traversing, the system can generate an expanded user query.

At block 710, the system can retrieve passages from one or more passage databases. The system can retrieve passages that the system determines are semantically related to the expanded user query. The system can rank each of the passages retrieved. Accordingly, in certain arrangements, the system retrieves only passages whose ranking exceeds a predetermined threshold. The ranking, in some arrangements, can be based on the cosine similarity between each passage and the expanded user query. Cosine similarity can be determined using MIPS. In certain arrangements, the system retrieves passages for which the cosine similarity equals or exceeds a minimum threshold (e.g., 0.6) that provides a sufficient margin to retrieve highly relevant, relevant, and somewhat relevant passages. In other arrangements, the system retrieves only the top-k ranked passages (e.g., k=5, 10, 20).

The system can select passages for input to a neural question generator by re-ranking the retrieved passages. The re-ranking can be based on a proxy for measuring each select passage's importance to the generating the set of information gather questions. The system, in certain arrangements, can use the number of sentences of the expanded user query that a passage is semantically related to as a proxy to measure each passage's importance.

At block 712, the system can use a neural question generator to generate a set of information-gathering questions. The neural question generator receives as input the expanded user query and a group of passages selected based on their individual rankings. Based on the expanded user query and group of select passages, the neural question generator generates the set of information-gathering questions.

The neural question generator, in certain arrangements, can be implemented in a generative adversarial network. The generative adversarial network can include a neural question evaluator. The neural question evaluator can be configured to fine-tune the neural question generator. To fine-tune the neural question generator, the neural question generator can be pre-trained using machine learning (e.g., deep learning) to identify which of multiple predetermined criteria each information-gathering question generated by the neural question generator satisfies. The neural question evaluator can generate rewards and losses accordingly using a reward function and a loss function. In a zero-sum game context, in accordance with certain arrangements, the goal of the adversarial network is to maximize the rewards earned and/or minimize the losses incurred by the neural question generator.

In certain arrangements, the neural question evaluator can be configured to compute a reward according to whether the information-gathering questions generated by the neural question generator include entities identical to or similar with a human-specified ground truth. The reward values fine tune the neural question generator by enabling the neural question generator to self-evaluate the information-gathering questions generated. The rewards can guide the neural question generator in refining a language model that is used to generate the information-gathering questions. The loss function scores determined by neural question generator 222 can re-rank passages for new information-gathering question generation.

At block 714, the system can present the set of information-gathering questions to a user. The system, in certain arrangements, conveys the set of information-gathering questions to the user via a wired or wireless connection to a user device (e.g., computer, laptop, tablet, smartphone, smartwatch). In certain other arrangements, the system can be integrated in the user device.

In some arrangements, the system can receive a user response to at least one information-gathering question from the set of information-gathering questions. The system can be configured to identify conversational cues from a user response. Based on an identified conversational cue, the system can update the query sub-graph. The updating has the effect of also updating the expanded user query, which in turn updates the information-gathering questions generated by the system.

In other arrangements, the system can distinguish among information-gathering questions, identifying unanswerable questions among the set of information-gathering questions. The system can be configured to respond to the identifying of an unanswerable question by conveying a prompt to the user via the user device requesting that the user to provide a contextual cue relating to the unanswerable question. Upon receiving the unanswerable question, the system can update the query sub-graph, which as described as the effect of updating the information gather question generated by the system. The likelihood is that the updating based on a contextual cue related to an unanswerable question can enable the system to generate an answerable one that substitutes for the unanswerable one.

Figure 8:
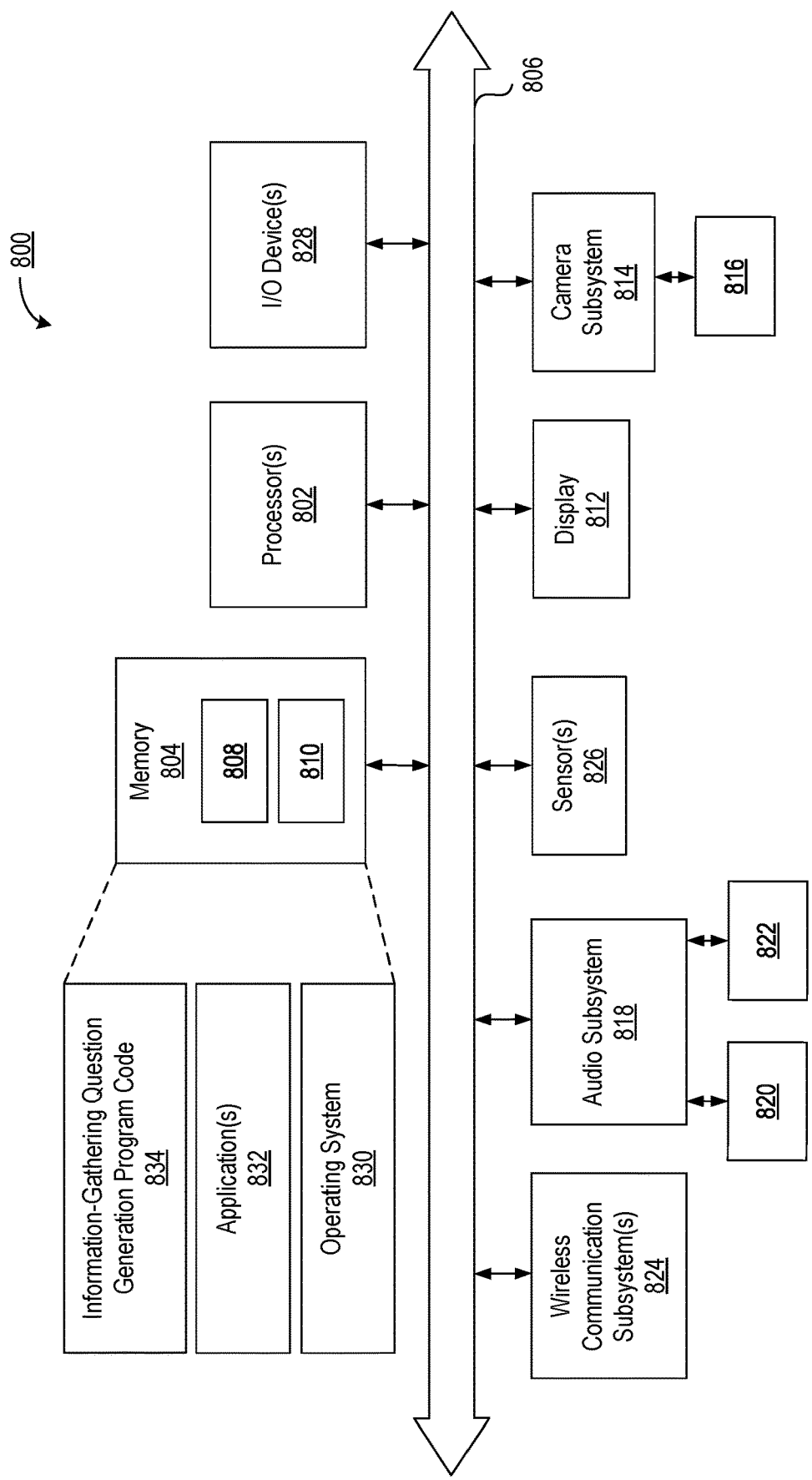
FIG. 8 illustrates an example computing device configured for operation as an information-gathering question generation system.

FIG. 8 illustrates an example device 800 configured operate as an information-gathering question generation system. Device 800 includes one or more processors 802 coupled to memory 804 through interface circuitry 806. Device 800 stores computer readable instructions (also referred to as "program code") within memory 804, which is an example of computer readable storage media. Processor(s) 802 execute the program code accessed from memory 804 via interface circuitry 806.

Memory 804 can include one or more physical memory devices such as local memory 808 and bulk storage device 810, for example. Local memory 808 is implemented as one or more non-persistent memory device(s) generally used during actual execution of the program code. Local memory 808 is an example of a runtime memory. Examples of local memory 808 include any of the various types of RAM suitable for use by a processor for executing program code. Bulk storage device 810 is implemented as a persistent data storage device. Examples of bulk storage device 810 include a hard disk drive (HDD), a solid-state drive (SSD), flash memory, a read-only memory (ROM), an erasable programmable read-only memory (EPROM), electrically erasable programmable read-only memory (EEPROM), or other suitable memory. Device 800 can also include one or more cache memories (not shown) that provide temporary storage of at least some program code in order to reduce the number of times program code must be retrieved from a bulk storage device during execution.

Examples of interface circuitry 806 include, but are not limited to, an input/output (I/O) subsystem, an I/O interface, a bus system, and a memory interface. For example, interface circuitry 806 can be implemented as any of a variety of bus structures and/or combinations of bus structures including a memory bus or memory controller, a peripheral bus, an accelerated graphics port, and a processor or local bus.

In one or more example implementations, processor(s) 802, memory 804, and/or interface circuitry 806 are implemented as separate components. Processor(s) 802, memory 804, and/or interface circuitry 806 may be integrated in one or more integrated circuits. The various components in device 800, for example, can be coupled by one or more communication buses or signal lines (e.g., interconnects and/or wires). Memory 804 may be coupled to interface circuitry 806 via a memory interface, such as a memory controller or other memory interface (not shown).

Device 800 can include one or more displays. Illustratively, for example, device 800 includes display 812 (e.g., a screen). Display 812 can be implemented as a touch-sensitive or touchscreen display capable of receiving touch input from a user. A touch sensitive display and/or a touch-sensitive pad is capable of detecting contact, movement, gestures, and breaks in contact using any of a variety of avail, able touch sensitivity technologies. Example touch sensitive technologies include, but are not limited to, capacitive, resistive, infrared, and surface acoustic wave technologies, and other proximity sensor arrays or other elements for determining one or more points of contact with a touch sensitive display and/or device.

Device 800 can include camera subsystem 814. Camera subsystem 814 can be coupled to interface circuitry 806 directly or through a suitable input/output (I/O) controller. Camera subsystem 814 can be coupled to optical sensor 816. Optical sensor 816 can be implemented using any of a variety of technologies. Examples of optical sensor 816 can include, but are not limited to, a charged coupled device (CCD) or a complementary metal-oxide semiconductor (CMOS) optical sensor. Optical sensor 816, for example, can be a depth sensor. Camera subsystem 814 and optical sensor 816 are capable of performing camera functions such as recording or capturing images and/or recording video.

Device 800 can include an audio subsystem 818. Audio subsystem 818 can be coupled to interface circuitry 806 directly or through a suitable input/output (I/O) controller. Audio subsystem 818 can be coupled to a speaker 820 and a microphone 822 to facilitate voice-enabled functions, such as voice recognition, voice replication, digital recording, and telephony functions.

Device 800 can include one or more wireless communication subsystems 824. Each of wireless communication subsystem(s) 824 can be coupled to interface circuitry 806 directly or through a suitable I/O controller (not shown). Each of wireless communication subsystem(s) 824 is capable of facilitating communication functions. Examples of wireless communication subsystems 824 can include, but are not limited to, radio frequency receivers and transmitters, and optical (e.g., infrared) receivers and transmitters. The specific design and implementation of wireless communication subsystem 824 can depend on the particular type of device 800 implemented and/or the communication network(s) over which device 800 is intended to operate.

As an illustrative and non-limiting example, wireless communication subsystem(s) 824 may be designed to operate over one or more mobile networks, WiFi networks, short range wireless networks (e.g., a Bluetooth), and/or any combination of the foregoing. Wireless communication subsystem(s) 824 can implement hosting protocols such that device 800 can be configured as a base station for other wireless devices.

Device 800 may include one or more sensors 826, each of which can be coupled to interface circuitry 806 directly or through a suitable I/O controller (not shown). Examples of sensor(s) 826 that can be included in device 800 include, but are not limited to, a motion sensor, a light sensor, and a proximity sensor to facilitate orientation, lighting, and proximity functions, respectively, of device 800. Other examples of sensors 826 can include, but are not limited to, a location sensor (e.g., a GPS receiver and/or processor) capable of providing geo-positioning sensor data, an electronic magnetometer (e.g., an integrated circuit chip) capable of providing sensor data that can be used to determine the direction of magnetic North for purposes of directional navigation, an accelerometer capable of providing data indicating change of speed and direction of movement of device 800 in 3D, and an altimeter (e.g., an integrated circuit) capable of providing data indicating altitude.

Device 800 further may include one or more input/output (I/O) devices 828 coupled to interface circuitry 806. I/O device(s) 828 can be coupled to interface circuitry 806 either directly or through intervening I/O controllers (not shown). Examples of I/O devices 828 include, but are not limited to, a track pad, a keyboard, a display device, a pointing device, one or more communication ports (e.g., Universal Serial Bus (USB) ports), a network adapter, and buttons or other physical controls. A network adapter refers to circuitry that enables device 800 to become coupled to other systems, computer systems, remote printers, and/or remote storage devices through intervening private or public networks. Modems, cable modems, Ethernet interfaces, and wireless transceivers not part of wireless communication subsystem(s) 824 are examples of different types of network adapters that may be used with device 800. One or more of I/O devices 828 may be adapted to control functions of one or more or all of sensors 826 and/or one or more of wireless communication subsystem(s) 824.

Memory 804 stores program code. Examples of program code include, but are not limited to, routines, programs, objects, components, logic, and other data structures. For purposes of illustration, memory 804 stores an operating system 830 and application(s) 832. In addition, memory 804 can store information-gathering question generation program code 834 for implementing a system, such as system 100.

Device 800 is provided for purposes of illustration and not limitation. A device and/or system configured to perform the operations described herein can have a different architecture than illustrated in FIG. 8. The architecture can be a simplified version of the architecture described in connection with FIG. 8 that includes a memory capable of storing instructions and a processor capable of executing instructions. In this regard, device 800 may include fewer components than shown or additional components not illustrated in FIG. 8 depending upon the particular type of device that is implemented. In addition, the particular operating system and/or application(s) included can vary according to device type as can the types of I/O devices included. Further, one or more of the illustrative components can be incorporated into, or otherwise form a portion of, another component. For example, a processor may include at least some memory.

Device 800 can be implemented as a data processing system, a communication device, or other suitable system that is suitable for storing and/or executing program code. Device 800 can be implemented as networked server, a computer (e.g., desktop, laptop, tablet computer), or other device for implementing the inventive arrangements disclosed herein.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" and similar language as described above, e.g., "if," "when," or "upon," mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A computer-implemented method, the computer-implemented method comprising:
   extracting one or more phrases from a user query, wherein the one or more phrases correspond to a predetermined category and are identified by parsing the user query using natural language processing;
   accessing a predetermined knowledge database and extracting entities therefrom, wherein the entities extracted are semantically related to the one or more phrases;
   generating a query sub-graph representing a relationship between each of the one or more phrases and the entities extracted from the predetermined knowledge database;
   traversing the query sub-graph, and based on the traversing, generating an expanded user query;
   retrieving from a passages database a plurality of passages that are semantically related to the expanded user query and ranking each of the plurality of passages based on semantic relatedness of each retrieved passage to the expanded user query; and
   outputting a set of information-gathering questions generated with a neural question generator based on the expanded user query and a group of select passages, wherein each select passage of the group is selected from the plurality of passages based on a ranking of the passage.

2. The computer-implemented method claim 1, further comprising:
   re-ranking each of the plurality of passages to determine which of the plurality of passages to include in the group of selected passages.

3. The computer-implemented method of claim 2, wherein the re-ranking is based on a proxy for measuring importance of each passage of the plurality of passages to the generating the set of information-gathering questions.

4. The computer-implemented method of claim 1, wherein the neural question generator is configured as part of a generative adversarial network that also includes a neural question evaluator.

5. The computer-implemented method of claim 4, wherein the neural question evaluator is configured to fine tune the neural question generator by identifying which of multiple predetermined criteria each information-gathering question satisfies and to generate rewards and losses accordingly using a reward function and a loss function.

6. The method of claim 1, further comprising:
   ordering the set of information-gathering questions using a conditional loss function.

7. The computer-implemented method of claim 1, further comprising:
   receiving a user response to at least one information-gathering question from the set of information-gathering questions;
   identifying a conversational cue from the user response; and
   updating the query sub-graph based on the conversational cue for an adaptive conversation.

8. The computer-implemented method of claim 1, further comprising:
   identifying at least one unanswerable question among the set of information-gathering questions to a user; and
   conveying a prompt to the user via a user device requesting the user to provide a contextual cue relating to the at least one unanswerable question.

9. A system, comprising:
   a processor configured to initiate operations including:
      extracting one or more phrases from a user query, wherein the one or more phrases correspond to a predetermined category and are identified by parsing the user query using natural language processing;
      accessing a predetermined knowledge database and extracting entities therefrom, wherein the entities extracted are semantically related to the one or more phrases;
      generating a query sub-graph representing a relationship between each of the one or more phrases and the entities extracted from the predetermined knowledge database;
      traversing the query sub-graph, and based on the traversing, generating an expanded user query;
      retrieving from a passages database a plurality of passages that are semantically related to the expanded user query and ranking each of the plurality of passages; and
      outputting a set of information-gathering questions generated with a neural question generator based on the expanded user query and a group of select passages, wherein each select passage of the group is selected from the plurality of passages based on a ranking of the passage, and wherein the neural question generator is configured as part of a generative adversarial network that also includes a neural question evaluator.

10. The system of claim 9, wherein the processor is configured to initiate operations comprising:
    ranking each of the plurality of passages retrieved from the passages database based on each retrieved passage's semantic relatedness to the expanded user query.

11. The system of claim 10, wherein the processor is configured to initiate operations comprising:
    re-ranking each of the plurality of passages to determine which of the plurality of passages to include in the group of selected passages.

12. The system of claim 11, wherein the re-ranking is based on a proxy for measuring importance of each passage of the plurality of passages to the generating the set of information-gathering questions.

13. The system of claim 9, wherein the neural question evaluator configured to fine tune the neural question generator by identifying which of multiple predetermined criteria each information-gathering question satisfies and to generate rewards and losses accordingly using a reward function and a loss function.

14. The system of claim 9, wherein the processor is configured to initiate operations comprising:
   ordering the set of information-gathering questions using a conditional loss function.

15. The system of claim 9, wherein the processor is configured to initiate operations comprising:
   receiving a user response to at least one information-gathering question from the set of information-gathering questions;
   identifying a conversational cue from the user response; and
   updating the query sub-graph based on the conversational cue for an adaptive conversation.

16. The system of claim 9, wherein the processor is configured to initiate operations comprising:
   identifying at least one unanswerable question among the set of information-gathering questions to a user; and
   conveying a prompt to the user via a user device requesting the user to provide a contextual cue relating to the at least one unanswerable question.

17. A computer program product, comprising:
   one or more computer readable storage media, and program instructions collectively stored on the one or more computer readable storage media, wherein the program instructions are executable by computer hardware to initiate operations including:
      extracting one or more phrases from a user query, wherein the one or more phrases correspond to a predetermined category and are identified by parsing the user query using natural language processing;
      accessing a predetermined knowledge database and extracting entities therefrom, wherein the entities extracted are semantically related to the one or more phrases;
      generating a query sub-graph representing a relationship between each of the one or more phrases and the entities extracted from the predetermined knowledge database;
      traversing the query sub-graph, and based on the traversing, generating an expanded user query;
      retrieving from a passages database a plurality of passages that are semantically related to the expanded user query and ranking each of the plurality of passages; and
      outputting a set of information-gathering questions generated with a neural question generator based on the expanded user query and a group of select passages, wherein each select passage of the group is selected from the plurality of passages based on a ranking of the passage; and
      ordering the set of information-gathering questions using a conditional loss function.

18. The computer program product of claim 17, wherein the neural question generator is configured as part of a generative adversarial network that also includes a neural question evaluator configured to fine tune the neural question generator by identifying which of multiple predetermined criteria each information-gathering question satisfies and to generate rewards and losses accordingly using a reward function and a loss function.

* * * * *